US006837137B2

(12) United States Patent
Ekern

(10) Patent No.: US 6,837,137 B2
(45) Date of Patent: Jan. 4, 2005

(54) SHEET CUTTING STAND

(76) Inventor: Mark Ekern, 207 W. Prairie St., Flandreau, SD (US) 57028

( * ) Notice: Subject to any disclaimer, the term of this patent is extended or adjusted under 35 U.S.C. 154(b) by 170 days.

(21) Appl. No.: 10/058,602

(22) Filed: Jan. 28, 2002

(65) Prior Publication Data

US 2003/0141647 A1 Jul. 31, 2003

(51) Int. Cl.[7] ............................ B26D 7/00; B25H 1/00; A47F 5/12; F16M 11/00

(52) U.S. Cl. ....................... 83/745; 83/471.2; 83/486.2; 83/486.4; 144/286.5; 269/303; 269/901; 108/6; 108/30; 108/119; 248/649; 248/675; 248/676; 248/124.1; 248/165

(58) Field of Search ............................. 83/486.1, 468.2, 83/486.4, 486.7, 574, 743, 745, 471.2, 471, 859, 565; 248/441.1, 445, 447, 454, 457, 674, 675, 677, 649, 673, 676, 122.1, 124.1, 165, 125.7; 269/73, 901, 303; 33/471, 470, 425, 32.3; 144/286.1, 286.5, 287; 108/1, 3, 6, 12, 30, 28, 115, 119

(56) References Cited

U.S. PATENT DOCUMENTS 450,735 A * 4/1891 Conant ........................ 33/430
1,921,489 A * 8/1933 Stein ........................... 269/73
2,785,708 A 3/1957 Krogen
2,942,633 A * 6/1960 King ........................... 83/745
D195,036 S * 4/1963 Grow et al. ................. D6/428
3,232,248 A * 2/1966 Gelb ............................. 108/2
3,675,594 A * 7/1972 Kritske .......................... 108/2
3,828,436 A * 8/1974 King ........................... 33/451
3,866,496 A 2/1975 Payne et al.
4,077,292 A * 3/1978 Cole ........................... 83/745
4,202,233 A * 5/1980 Larson ........................ 83/745
4,327,619 A * 5/1982 McNamee, Jr. ............ 83/471.3
4,555,969 A 12/1985 Abt
4,681,042 A * 7/1987 Roberts ......................... 108/6
4,802,399 A 2/1989 Olson
4,815,395 A * 3/1989 Trueg ......................... 108/187
4,884,791 A 12/1989 Callender
4,965,935 A * 10/1990 Bourque ........................ 33/26
5,144,994 A 9/1992 Stecker, Sr.
5,365,822 A * 11/1994 Stapleton et al. ............. 83/745
5,473,968 A 12/1995 Break et al.
5,582,088 A 12/1996 Harter
5,782,279 A 7/1998 Stecker, Sr.
6,192,808 B1 * 2/2001 Bue ........................... 108/115

OTHER PUBLICATIONS

Fine Woodworking, Sep. 30, 2001, p. 16.

* cited by examiner

*Primary Examiner*—Boyer D. Ashley

(57) ABSTRACT

A cutting stand for sheet goods is disclosed that includes supports, with each support including a foot, a lower upright joined to the foot and an angled upper support joined to the lower support. The cutting stand additionally includes a carriage joined to the supports, and sheet goods may be removably mounted on the carriage. The cutting stand also includes a guide movably joined to sheet goods, and the guide is adapted to be removable from the sheet goods.

18 Claims, 6 Drawing Sheets

SHEET CUTTING STAND

BACKGROUND OF THE INVENTION

The device as disclosed herein is a modular device for holding and cutting sheet goods, and more particularly is an inexpensive support rack that can be taken down for transport between job sites or storage and reassembled at a job site to support a standard sized sheet of sheet goods for accurate cutting to a desired size for use.

The classification of sheet goods generally includes manufactured wood products that are produced and sold in sheets such as plywood, particle board, chip board, oriented strand board, medium density fiberboard (MDF), and other forms of wood products preformed into sheets. Sheet goods, which may also include drywall, are generally sold in sheets that are four feet by eight feet and or a designated thickness, although the size can vary.

Regardless of the exact size of the sheet goods being used, problems persist. Full sheets regularly need to be cut for use. Typically, the goods are laid flat, e.g. horizontal, and the worker is required to stretch over the sheet. For instance, the cuts can be as long as the sheet, typically eight feet, requiring the worker to either stretch and have very long arms, make multiple cuts or somehow walk along the length of the goods while cutting. Workers often find it very difficult to cut at the exact place over an extended length of the cut. While electrically powered saws make the cutting relatively easy, they do little to help the accuracy and precision of the cut.

Various permanent jigs and appliances are available for use in established shops. Frequently, the sheet goods are cut using a table saw. However, the use of a table saw requires that the table saw have a large table to support the sheet, space around the table saw to move the sheet through, and that the operator lift the sheet onto the table and uniformly move the sheet through the saw blade. While this method of cutting sheet goods works quite well in an established shop, it cannot be done in the field or in a private home.

An alternative method of cutting sheets in a shop is the use of a special holding stand wherein the sheet is mounted on the stand and a track mounted saw is used to cut the sheet goods. Cutting stands of this class have been very good, but, very expensive and as such are ordinarily only used where numerous sheets must be cut on a daily basis, such as a shop manufacturing cabinets. Unless the cutting stand is being fully utilized, it is cost prohibitive to acquire.

In the prior art, when sheet goods must be cut in the field, they are cut by placing the sheet on some form of horizontal support, such as saw horses, and using a portable circular saw to cut the sheet goods. While this method does work, it is often difficult to accurately mark the cut line and even more difficult to follow the marked line. In some uses, the variance of a fraction of an inch in the cut doesn't matter or is hidden. Here the problem may not be not as great, although the stretching with power tools in operation raises safety concerns.

In other uses, it is necessary to have the cut made exactly and the cut to be straight. This creates the problem where the worker cutting the sheet of sheet goods must be very careful and particular when cutting or risk either wasting a sheet or having to spend additional time to correct the inconsistencies in the previously cut edge. This simply is not efficient.

One attempt to provide for accurate cutting of sheet goods in the field has been to use a straight piece of lumber as a straightedge to guide the cut. While this method does work, it still requires that the user place the sheet of sheet goods onto some sort of cutting stand for support and then secure the straight piece of lumber to the sheet to guide the saw for cutting. A user cannot simply hold the straightedge lumber when making a cut of four or eight feet to cut the sheet of sheet goods. The straightedge must be secured by either an assistant or being clamped. This takes time and is inefficient. Moreover, clamps tend to operate against a surface of the sheet and may cause damage thereto.

What is needed is a portable cutting stand, which is easy to assemble and disassemble, allowing easy transport. Preferably the design should have a minimum of parts and take advantage of materials already available on the job site. The clamp of the guide should further operate against an edge of the sheet goods to avoid damge to a surface, which may show in the finished product.

SUMMARY OF THE INVENTION

The invention as described herein is a portable stand that can be easily transported to a work site and assembled for use. The cutting stand provides a raised angled support table for holding the sheet of sheet goods and an alignable movable cutting guide for guiding a saw through a cut at a selected location. The cutting stand for sheet goods is provided with supports, a carriage, a guide and is used in conjunction with sheet goods.

The supports may include a foot, a lower upright and an angled upper upright portion. The lower upright is joined to the foot and the upper upright. Optionally, the upper upright may be rotationally joined to the lower upright. The support preferably includes connectors.

The carriage is joined to the supports and has horizontal members selectively received within the connectors of the supports. At least one horizontal member, desirably the lowest, can be selectively joined to sheet hooks having platforms. Sheet goods may be removably mounted on the carriage, resting on the platforms of the sheet hooks.

The guide can be movably removably joined to sheet goods. The guide, in the preferred embodiment includes a foot and a clamp joined to a straight edge. The foot has a bracket with a lip with the lip being adapted to engaged a lower edge of sheet goods. The clamp has a bracket selectively securable to a post such that the post extends through post apertures defined in the bracket. The post preferably has a hook adapted to engage an upper edge of sheet goods.

Advantageously, the present invention is a cutting stand that is simple in design, allowing lower cost and ease of storage.

Also advantageously, this cutting stand allows the user to arrange the angle at which the sheet goods are presented.

Another advantage is that the uprights join to horizontal members, minimizing the number of uprights needed to support even the longest of sheet goods.

Still another advantage is that the sheet hooks may be moved out of the way of the cutting blade and into the positions where support is most needed.

Also advantageously the sheet goods can be supported by relatively soft sacrificial wood supports that lessen the opportunity to mar the surface of the sheet of sheet goods.

Also advantageously the clamp associated with the guide operates against the edge of the sheet goods where it less likely to mar the surface of the sheet of sheet goods.

Other advantages will become clear from reading the following detailed description.

DESCRIPTION OF THE PREFERRED EMBODIMENTS

Figure 1:
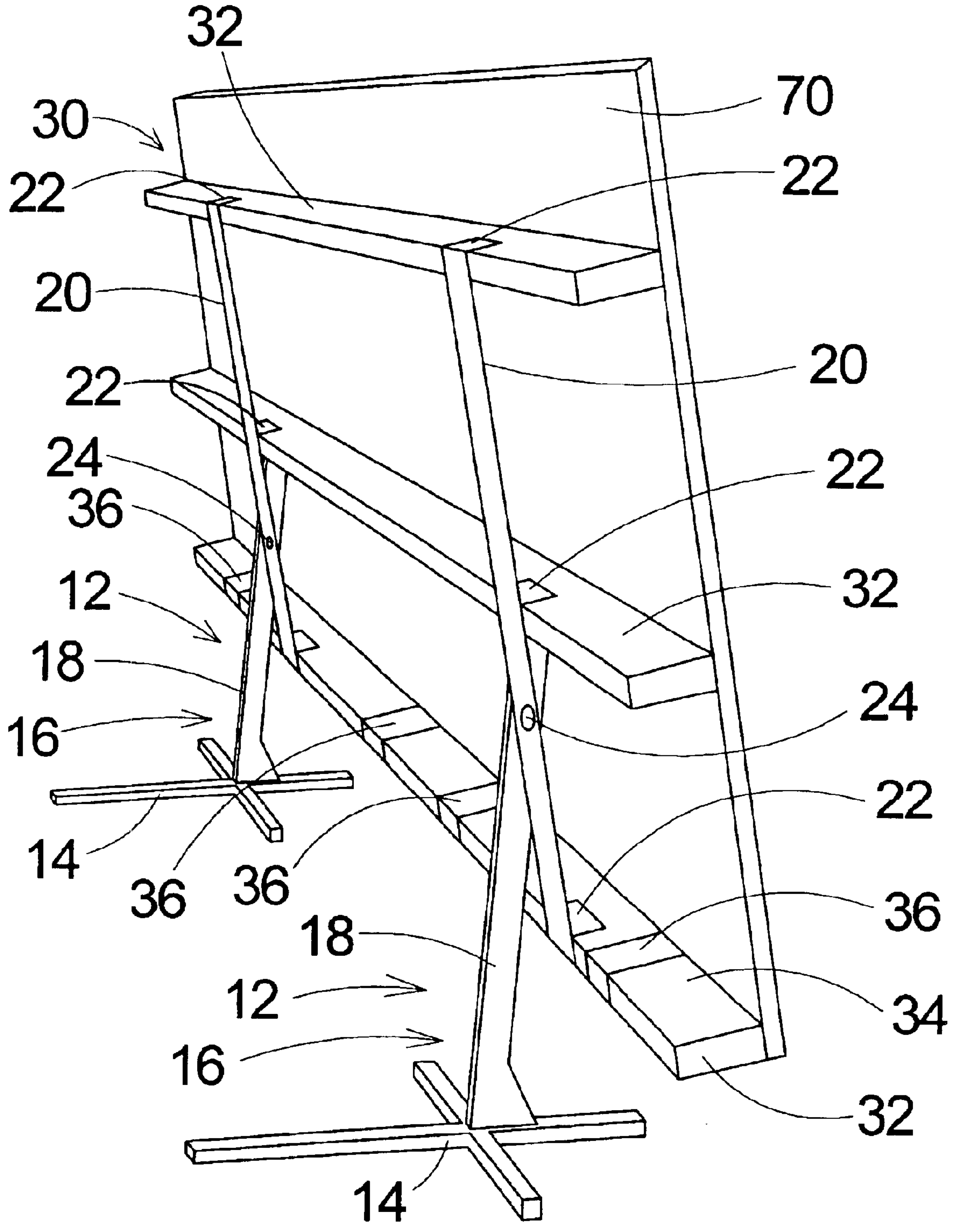
FIG. 1 is a hind prospective view showing the cutting stand with sheet goods mounted thereon.
Figure 2:
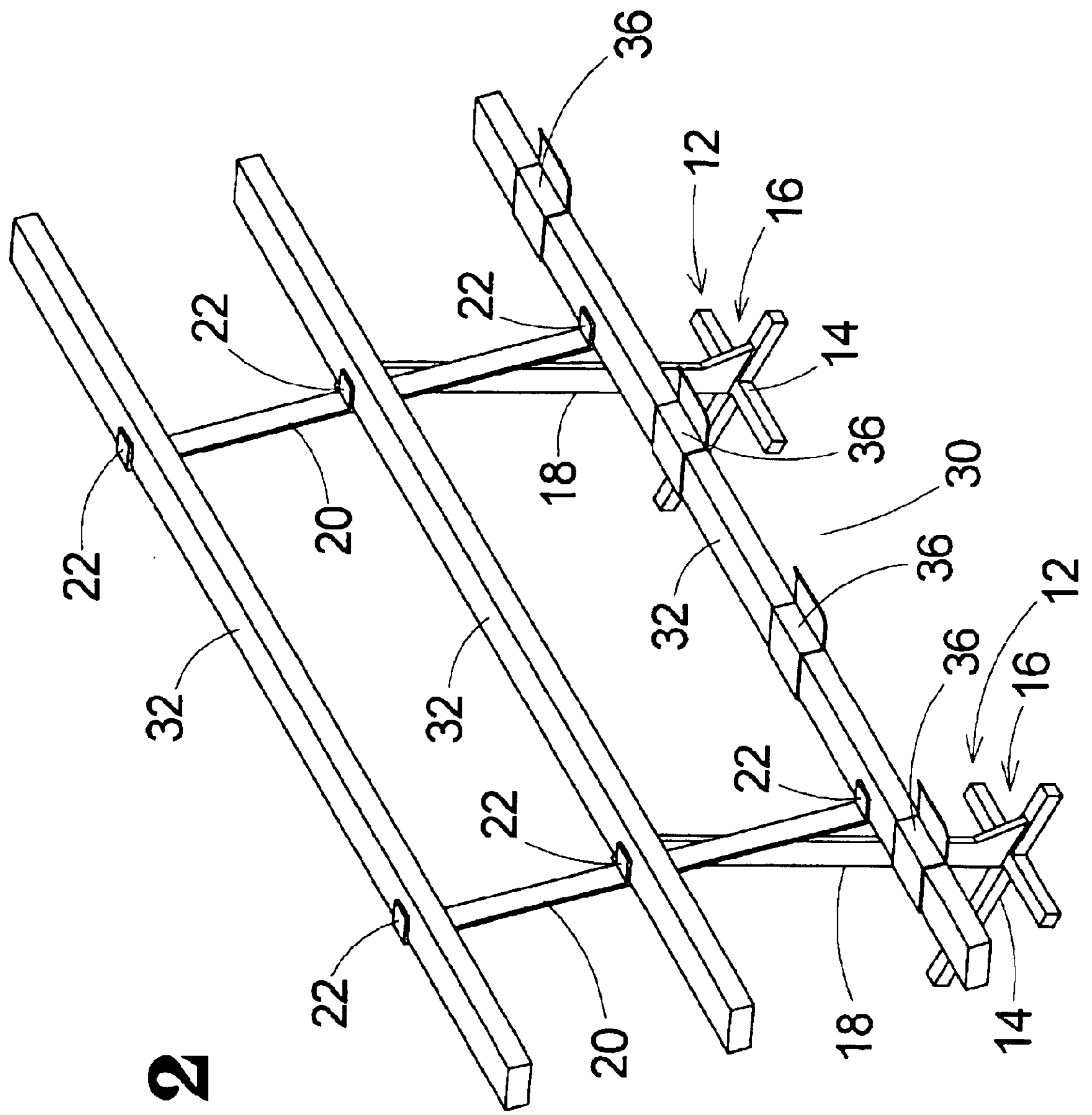
FIG. 2 is a forward prospective view showing the carriage mounted to the uprights and the sheet hooks mounted to the lower horizontal member.
Figure 3:
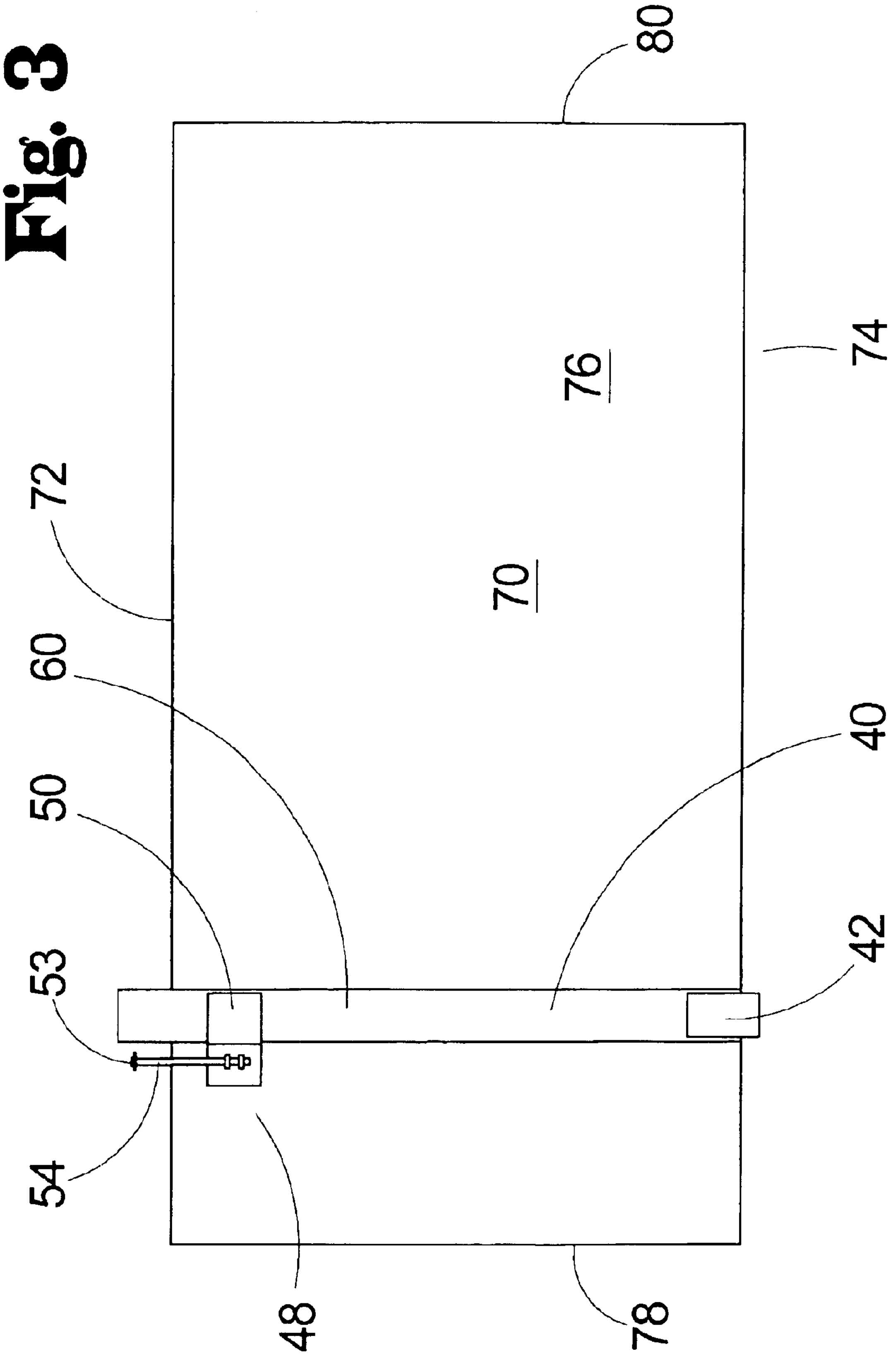
FIG. 3 is a partial view showing the guide mounted to the carriage.
Figure 4:
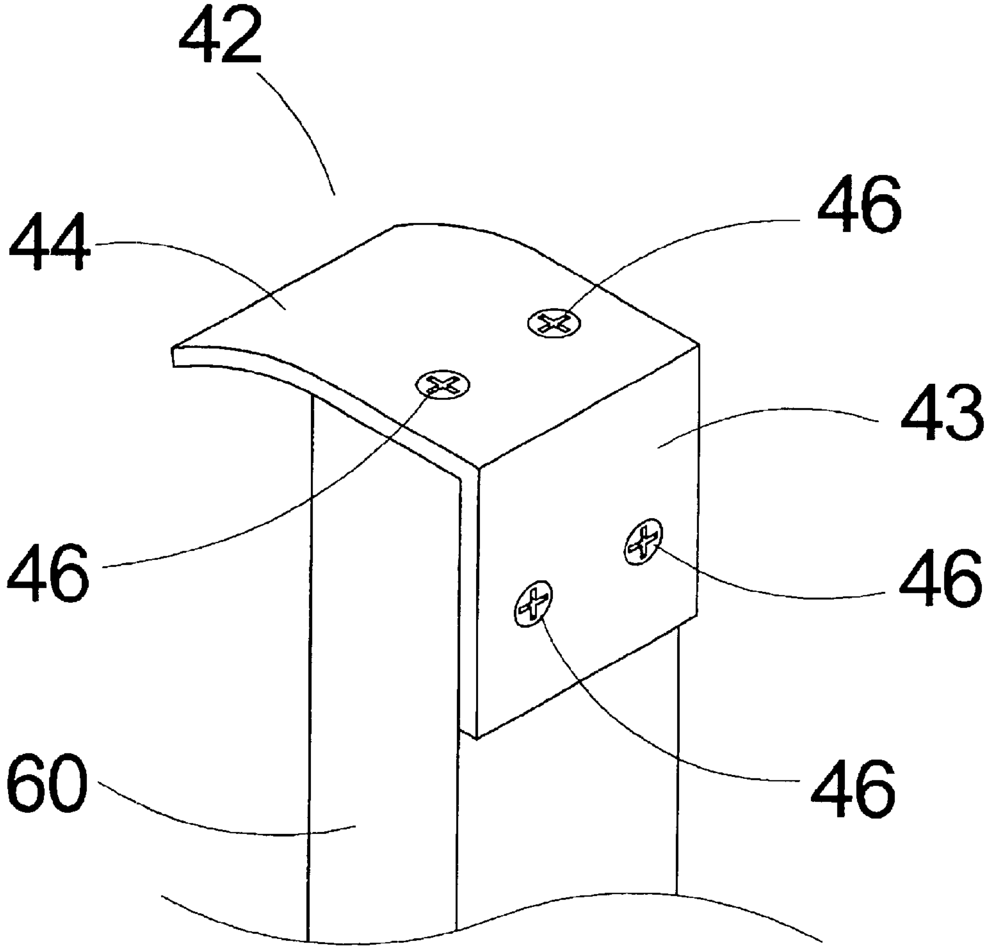
FIG. 4 is a partial view showing the foot mounted to the straight edge of the guide.
Figure 5:
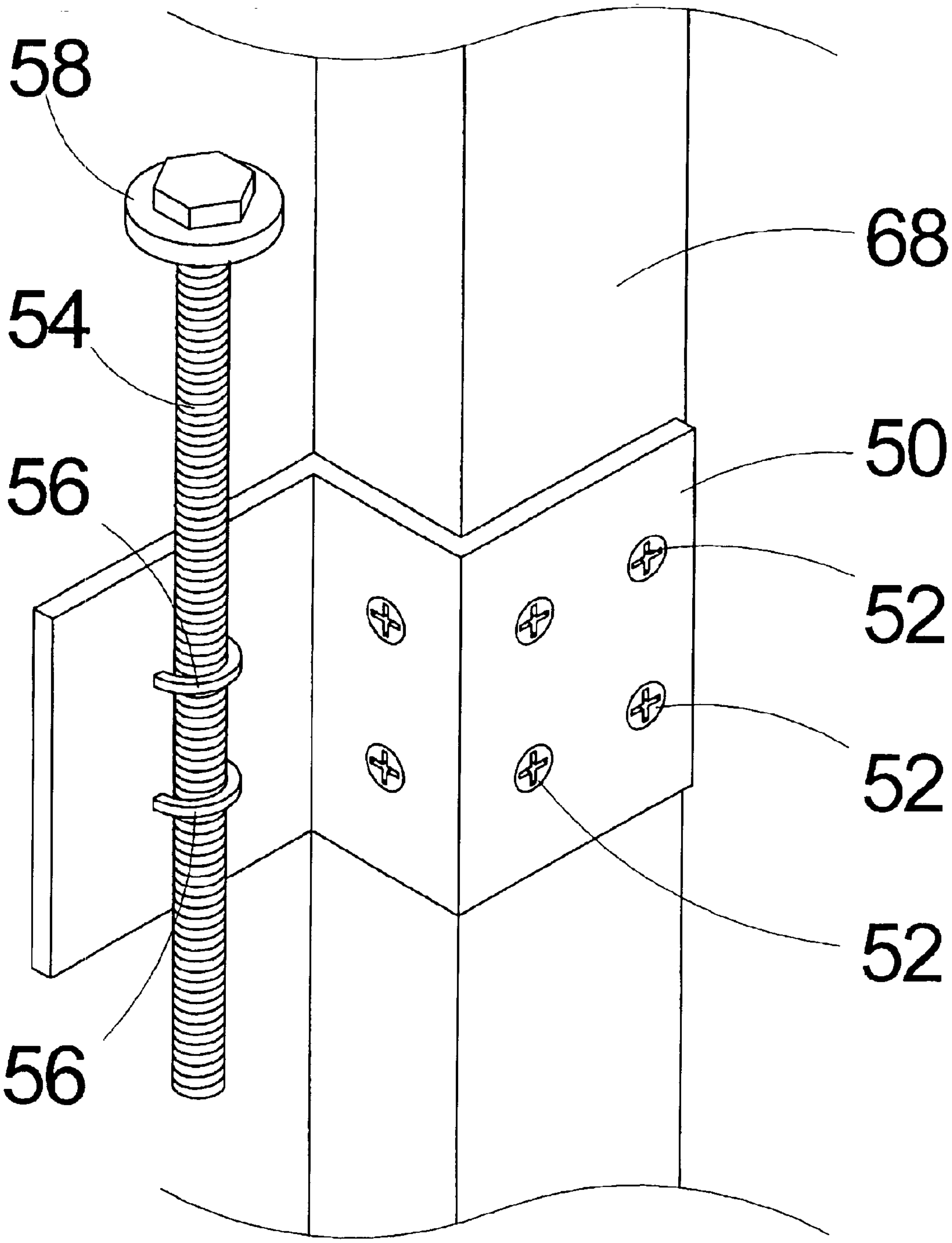
FIG. 5 is a partial view of the guide showing the clamp mounted to the straight edge.
Figure 6:
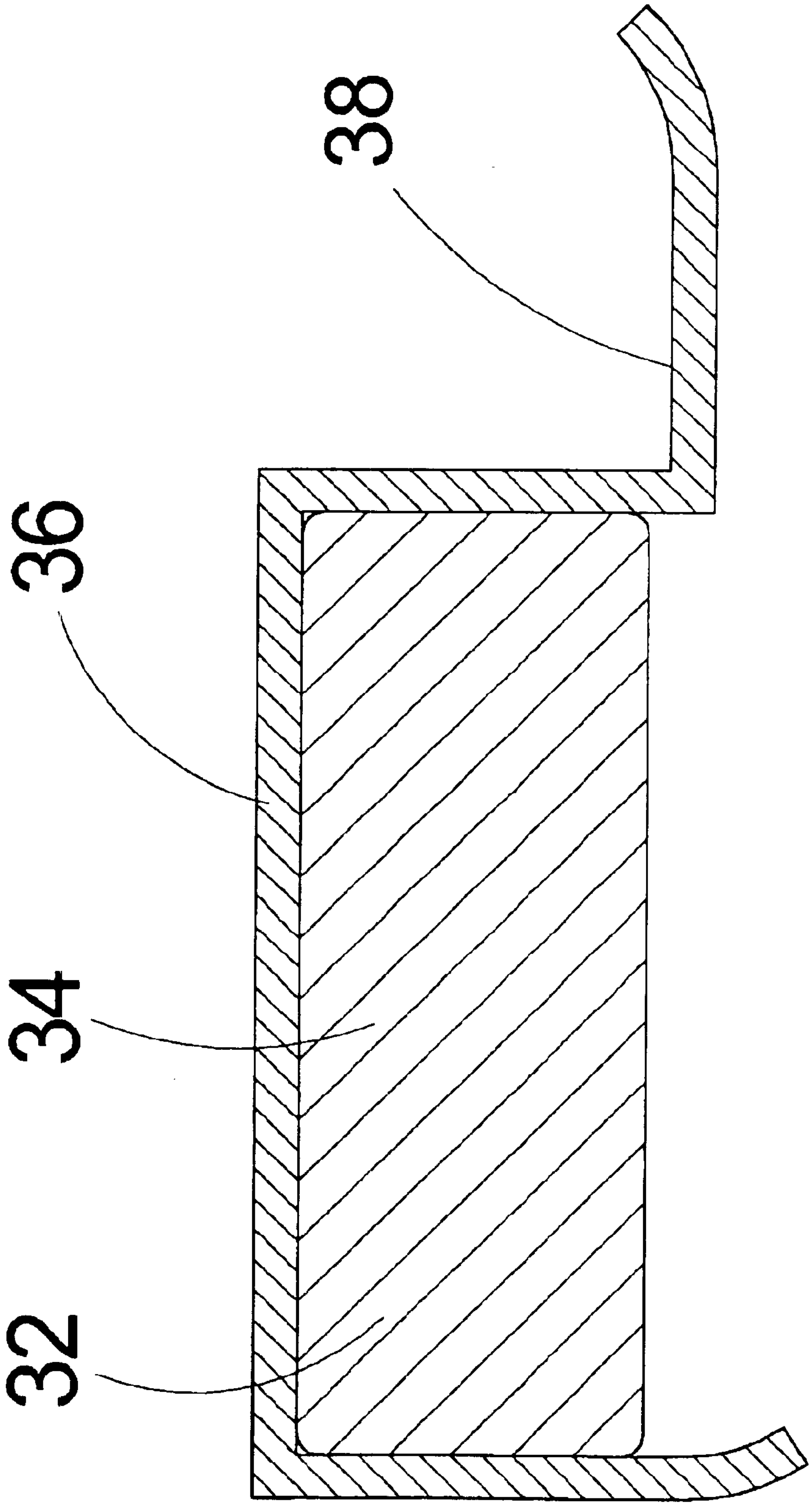
FIG. 6 is an end view of a sheet hook shown installed over a carriage horizontal member

Cutting stand 10 supports sheet goods 70 for cutting. The stand 10 includes supports 12, a carriage 30, a guide 40 and is useable with sheet goods 70. Each component will be described in serial fashion.

Each support 12 may include a foot 14 and an upright 16, which may comprise a lower upright 18 and an upper upright 20. In the preferred embodiment two supports 12 are present as additional supports 12 get in the way of the user and a single support 12 generally uses a larger than desired foot 14 and may require user interaction for stability, although such a design is plausable. The foot 14 may have any configuration. The shape shown is a cross shape with the longer portion extending rearward for support. The foot 14 may be design to disassemble for reducing package size. The upper upright 20 may be rotationally joined to the lower upright 18 with a connector 24, allowing the user to orient the sheet goods 70 at the most desired angle for their work. Fasteners 22, preferably C-shaped portions are joined to the support and are adapted to receive the carriage 30.

The carriage 30 includes horizontal members 32 selectively preferably snugly received within the fasteners 22 of the supports. Suitable horizontal members 32 include any material not destructive to cutting blades such as wood or plastic. Most desirably, the horizontal members 32 are 2×4s or other 2×lumber which can be used as a sacrificial support. At least one horizontal member 32, most desirably the lowest horizontal member 34, may support the sheet hooks 36. Sheet hooks 36 are adapted to support the sheet goods 70 when the stand 10 is in use. The sheet hooks 36 optionally include platforms 38 for engagement of a lower edge 74 of the sheet goods 70.

Sheet goods 70 are used in conjunction with the stand 10, via placement onto the carriage 30, and upon the sheet hooks 36 where the sheet goods may be cut to a selected size. Sheet goods 70 have an upper edge 72, a lower edge 74 and a front surface 76. Sheet goods 70 are supported by the sheet hooks 36 and lean against the inclined carriage 30 where the sheet goods 70 are retained by gravity.

The guide 40 is an aid to cutting straight lines without the need for marking the sheet goods 70, by resting against the front surface 76 of sheet goods 70. Guide 40 movably mounts to sheet goods 70 and is removable therefrom. In a preferred embodiment, the guide 40 includes a foot 42 and a clamp 48 joined to a straight edge 60. The foot 42 has a bracket 43 with a lip 44, the lip 44 being adapted to engaged the lower edge 74 of the sheet goods 70. Fasteners 46 such as screws or nails may be used to adhere the bracket 43 to the straight edge 60. The straight edge 60 is preferably a straight length of 2×4 lumber selected for its straightness and cut to an appropriate length to span the chosen dimension of the sheet of sheet goods 70 to be cut.

Clamp 48 in the preferred mode has a bracket 50 selectively securable to a post 54. The post 54 extends through post apertures 56 defined in the bracket 50. The post 54 has a hook 58 adapted to engage the upper edge 72 of the sheet goods 70. The post 54 selectively locks relative to the bracket 50 and the bracket 50 secures to the straight edge with fasteners 52, such as screws or nails. The post 54 may be threaded to movably engage the post apertures 56 and similarly engage the hook 58. The hook 58 is preferably an oval or egg shaped disk of metal or other suitable material having sufficient rigidity to selectively retain the guide 40 in a selected position. The hook 58 may also threadedly engage the post 54.

While the previous description of the clamp 48 has described the mounting of the clamp in a vertical position to cut a sheet of sheet goods 70 to length, it is understood that by merely utilizing a longer straight edge 60 that the clamp may be clamped along the length of a sheet of sheet goods 70 and the sheet goods cut to width.

In the operation of cutting sheet goods, the user is provided at least one foot 14 joined with an upright 16. Horizontal members 32 are selectively joined to the uprights 16. The lower horizontal member 34 may be connected to sheet hooks 36, which may be provided with a platform 38. Sheet goods 70 may then be positioned on the sheet hooks 36 for cutting. In one embodiment, a guide 40 may be positioned on the sheet goods 70, providing a straight edge to cut against, while avoiding the need to mark a cutting line thereon. Such guide can be clamped to the sheet goods 70 if desired. Such arrangement allows for easy access to large sheet goods 70 for cutting.

Although the present invention has been described with reference to preferred embodiments, workers skilled in the art will recognize changes may be made in form and detail without departing from the spirit and scope of the invention

I claim:

1. A cutting stand for sheet goods comprising:

supports, each support including a foot, a lower upright joined to the foot and an angled upper upright rotationally joined to the lower upright, the supports including fasteners;

a carriage joined to the supports, the carriage having horizontal members selectively received within the fasteners of the supports, at least one horizontal member being selectively joined to a sheet hook, and the sheet hook having platforms adapted to support sheet goods; and a guide being movably adapted to be removably joined to sheet goods, the guide including a foot and a clamp joined to a straight edge, the foot of the guide having a bracket with a lip, the lip being adapted to engage an edge of sheet goods, the clamp having a bracket selectively securable to a post, the post extending through post apertures defined in the bracket of the clamp and the post having a hook adapted to engage an opposite edge of sheet goods.

2. A cutting stand for sheet goods comprising:

supports, each support including a foot, a lower upright joined to the foot and an angled upper upright joined to the lower upright;

a carriage joined to the supports, the carriage adapted to support sheet goods;

a guide capable of being removably mounted on sheet goods in a manner permitting selective positioning of the guide with respect to the sheet goods;

at least one sheet support removably mountable on a lower portion of the carriage and positionable along the carriage for supporting a lower edge of a sheet good positioned on the carriage; and wherein each of the supports includes at least one connector joined to the upper upright, each of the connectors being capable of removably receiving a portion of an elongate member extending in a substantially horizontal orientation between respective connectors of the supports.

3. The cutting stand of claim 2 wherein the guide further comprises a foot and a clamp joined to a straight edge.

4. The cutting stand of claim 3 wherein the foot includes a bracket having a lip capable of engaging edges of sheet goods.

5. A cutting stand for sheet goods comprising:

supports, each support including a foot, a lower upright joined to the foot and an angled upper upright joined to the lower upright;

a carriage joined to the supports, the carriage adapted to support sheet goods;

a guide capable of being removably mounted on sheet goods in a manner permitting selective positioning of the guide with respect to the sheet goods;

at least one sheet support removably mountable on a lower portion of the carriage and positionable along the carriage for supporting a lower edge of a sheet good positioned on the carriage;

wherein the guide further comprises a foot and a clamp joined to a straight edge; and wherein the foot includes a bracket having a lip capable of engaging edges of sheet goods.

6. The cutting stand of claim 5 wherein the lower upright is rotationally joined to the upper upright.

7. The cutting stand of claim 5 wherein the lower upright is joined to the upper upright with a fastener.

8. The cutting stand of claim 5 wherein at least a pair of the sheet supports are removably mountable on the carriage, positions of the sheet supports being adjustable on the carriage independently of each other.

9. The cutting stand of claim 5 further comprising sheet good mounted to the carriage.

10. The cutting stand of claim 5 wherein the carriage includes a support surface against which a face of a sheet good is restable, and wherein a portion of the at least one sheet support extends substantially perpendicular to the support surface of the carriage.

11. The cutting stand of claim 5 wherein the clamp further comprises a bracket selectively securable to a post, the post extending through post apertures defined in the bracket.

12. The cutting stand of claim 11 wherein the post includes a hook capable of engaging an edge of sheet goods.

13. The cutting stand of claim 5 wherein the carriage comprises substantially horizontal members.

14. The cutting stand of claim 13 wherein the horizontal members are 2×4 lumber.

15. The cutting stand of claim 13 wherein the horizontal members are selectively mountable on and removable from the supports.

16. The cutting stand of claim 13 wherein the horizontal members are joined to the supports via connectors.

17. The cutting stand of claim 13 wherein the at least one sheet support comprises a sheet hook removably mountable on one of the horizontal members.

18. The cutting stand of claim 17 wherein the at least one sheet hook includes a platform for resting the lower edge of sheet goods thereon.

* * * * *